(12) United States Patent
Heins et al.

(10) Patent No.: US 10,107,210 B2
(45) Date of Patent: Oct. 23, 2018

(54) METHOD FOR SWITCHING, IN AN EFFICIENCY-OPTIMIZED MANNER, A FOUR-STROKE INTERNAL COMBUSTION ENGINE INCLUDING A PLURALITY OF CYLINDERS AND A FULLY VARIABLE VALVE TRAIN BETWEEN A FULL CYLINDER OPERATION AND A PARTIAL CYLINDER OPERATION

(71) Applicant: Volkswagen Aktiengesellschaft, Wolfsburg (DE)

(72) Inventors: Sebastian Heins, Braunschweig (DE); Volker Grajewski, Ummern (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/861,116

(22) Filed: Jan. 3, 2018

(65) Prior Publication Data
US 2018/0128190 A1 May 10, 2018

Related U.S. Application Data

(63) Continuation of application No. PCT/EP2016/063018, filed on Jun. 8, 2016.

(30) Foreign Application Priority Data

Jul. 8, 2015 (DE) .................... 10 2015 111 056

(51) Int. Cl.
*F02D 13/06* (2006.01)
*F02D 13/02* (2006.01)
*F02D 17/02* (2006.01)

(52) U.S. Cl.
CPC ......... *F02D 13/06* (2013.01); *F02D 13/0207* (2013.01); *F02D 17/02* (2013.01)

(58) Field of Classification Search
CPC ....... F02D 13/06; F02D 17/02; F02D 13/0207
See application file for complete search history.

(56) References Cited

U.S. PATENT DOCUMENTS 7,077,085 B2 * 7/2006 Arai .................... F01L 13/0015
123/90.15
2003/0062019 A1 4/2003 Schaefer-Siebert
(Continued)

FOREIGN PATENT DOCUMENTS

DE 10 2005 039 663 A1 3/2006
DE 10 2006 033 024 A1 1/2008
(Continued)

OTHER PUBLICATIONS

Fierl, Rudolf; Lauer, Frederic: Mechanisch vollvariabler Ventiltrieb and Zylinderabschaltung [Mechanically fully variable valve train and cylinder switch-off means]. In: MTZ—Motortechnische Zeitschrift [MTZ—engine design magazine], Apr. 1, 2013, pp. 334-341; paragraph 8, figures 5, 8, and 9.
(Continued)

*Primary Examiner* — Hung Q Nguyen
(74) *Attorney, Agent, or Firm* — Manfred Beck, P.A.

(57) ABSTRACT

A method for operating a four-stroke internal combustion engine is provided. The internal combustion engine can be switched over between a full cylinder operation and a partial cylinder operation. The valve lift of the inlet valves of all cylinders are set temporarily to a maximum lift during the switchover between full cylinder operation and partial cylinder operation, wherein, during the switchover, in a step a), in an early switchover phase, the valve lift is increased at all cylinders and, at the same time, the time of the maximum valve lift is adjusted in the early direction by means of a phase adjuster and/or, in a step b), in a late switchover phase, the valve lift is reduced at least at the cylinders which are to (Continued)

continue to run after the switchover and, at the same time, the time of the maximum valve lift is adjusted in the late direction.

10 Claims, 2 Drawing Sheets

(56) References Cited

U.S. PATENT DOCUMENTS

| | | |
|---|---|---|
| 2006/0037578 A1 | 2/2006 | Nakamura |
| 2008/0071462 A1 | 3/2008 | Christ et al. |
| 2009/0050087 A1* | 2/2009 | Ezaki .................. F01L 1/02 123/90.16 |
| 2015/0047586 A1 | 2/2015 | Nowak et al. |

FOREIGN PATENT DOCUMENTS

| | | |
|---|---|---|
| DE | 10 2010 062 319 A1 | 6/2012 |
| DE | 10 2012 006 983 A1 | 10/2013 |
| DE | 20 2014 100 426 U1 | 3/2014 |
| EP | 1 298 300 A2 | 4/2003 |

OTHER PUBLICATIONS

Search Report including Provisional Assessment of Patentability issued by the German Patent and Trademark Office for German Patent Application No. DE 10 2015 111 056.3, dated Mar. 14, 2016.
International Search Report for International Application No. PCT/EP2016/063018 and translation thereof, dated Aug. 10, 2016.
International Preliminary Report on Patentability for International Application No. PCT/EP2016/063018 including Written Opinion of the International Searching Authority and translation thereof, dated Jan. 9, 2018.

* cited by examiner ic # METHOD FOR SWITCHING, IN AN EFFICIENCY-OPTIMIZED MANNER, A FOUR-STROKE INTERNAL COMBUSTION ENGINE INCLUDING A PLURALITY OF CYLINDERS AND A FULLY VARIABLE VALVE TRAIN BETWEEN A FULL CYLINDER OPERATION AND A PARTIAL CYLINDER OPERATION

CROSS-REFERENCE TO RELATED APPLICATIONS

This application is a continuation, under 35 U.S.C. § 120, of copending International Application No. PCT/EP2016/063018, filed Jun. 8, 2016, which designated the United States; this application also claims the priority, under 35 U.S.C. § 119, of German Patent Application No. DE 10 2015 111 056.3, filed Jul. 8, 2015; the prior applications are herewith incorporated by reference in their entirety.

BACKGROUND OF THE INVENTION

Field of the Invention

The invention relates to a method for switching over a four-stroke internal combustion engine having a plurality of cylinders and a fully variable valve train between a full cylinder operation and a partial cylinder operation in a manner which is optimized in terms of the degree of efficiency. In other words, the four-stroke internal combustion engine is configured such that at least one cylinder can be switched off and the lift of the inlet valves and outlet valves of the at least one cylinder can be set to a zero lift position.

German Patent Application Publication No. DE 10 2012 006 983 A1 discloses a mechanically controllable valve train arrangement, an internal combustion engine, and a method for operating an internal combustion engine. In the case of the described internal combustion engine and the method, the inlet valves of all cylinders are to be operated with an identical, increasing lift height in the case of a rising torque in the idling range. In the transition range between the idling range and a part load range, the inlet valves of half of the cylinders are to be operated with an increasing lift height, and the inlet valves of the other half of the cylinders are to be operated with a decreasing lift height. In the part load range, the inlet valves of half of the cylinders are to be operated with an increasing lift height, and the inlet valves of the other half of the cylinders are to be operated with zero lift. In the transition range between the part load range and the full load range, the inlet valves of half of the cylinders are to be operated with a decreasing lift height, and the inlet valves of the other half of the cylinders are to be operated with an increasing lift height. In the full load range itself, all inlet valves of all cylinders are to be operated with an identical, increasing lift height. DE 10 2012 006 983 A1 makes no reference to any changes of the closure times of the inlet valves and/or the ignition time.

In the article "Mechanisch vollvariabler Ventiltrieb und Zylinderabschaltung" [Mechanically fully variable valve train and cylinder switch-off means], published on pages 334-341 in the 04/2013 edition of "MTZ—Motortechnische Zeitschrift" [MTZ—engine design magazine], which can be downloaded on the Internet at http://www.springerprofessional.de/mechanisch-vollvariabler-ventiltrieb-und-zylinderabschaltung/4049996.html, a method for switching over a four cylinder internal combustion engine from four cylinder operation to two cylinder operation is described, according to which starting is carried out in throttle-free four cylinder operation, a valve lift adjustment is then performed using the throttle valve in order to limit the cylinder adjustment and in order to avoid a load jump, and the ignition angle is set here toward an optimum position of the center of combustion mass. At a later time of the switchover, that is to say still before that point is reached, at which the fuel injection is switched off at two cylinders, a torque reserve is generated by way of renewed opening of the throttle valve and adjustment of the ignition angle in the late direction. During switching off of the fuel injection, the ignition angle is then to be adjusted simultaneously in the early direction, in order to avoid a torque jump. Subsequently, first of all the outlet valves and, subsequently the inlet valves are to be brought to a standstill by way of rotation of actuating shafts. Finally, the load point is then to be set in a throttle-free manner by way of further rotation of an inlet actuating shaft.

SUMMARY OF THE INVENTION

The invention is based on the object of providing a method for operating a four-stroke internal combustion engine having a plurality of cylinders and a fully variable valve train, by means of which method the degree of efficiency can be increased during the switchover between a full cylinder operation and a partial cylinder operation.

With the foregoing and other objects in view there is provided, in accordance with the invention, a method for operating an internal combustion engine, the method including:

providing a four-stroke internal combustion engine having a plurality of cylinders, a fully variable valve train, and at least one phase adjuster for changing a time of a maximum valve lift of inlet valves, wherein the four-stroke internal combustion engine is configured so as to be capable of being switched over between a full cylinder operation and a partial cylinder operation, wherein at least one of the cylinders is switched off in the partial cylinder operation and, to this end, valves of the at least one cylinder are moved into a zero lift position and remaining ones of the cylinders continue to run;

setting a valve lift of the inlet valves of all of the cylinders temporarily to a maximum lift during a switchover between the full cylinder operation and the partial cylinder operation; and performing step a) and/or step b) during the switchover of the four-stroke internal combustion engine between the full cylinder operation and the partial cylinder operation, wherein in step a), in an early switchover phase, the valve lift is increased at all of the cylinders and, at the same time, the time of the maximum valve lift is adjusted in an early direction by the at least one phase adjuster, and wherein in step b), in a late switchover phase, the valve lift is reduced at least at those of the cylinders which are to continue to run after the switchover, and, at the same time, the time of the maximum valve lift is adjusted in a late direction.

A method according to the invention relates to the operation of a four-stroke internal combustion engine having a plurality of cylinders, a fully variable valve train and at least one phase adjuster for changing the time of the maximum valve lift of the inlet valves. A fully variable valve train is understood to mean that the valves can be adjusted at least partially between a zero lift position (valve remains closed during a cycle) and a maximum lift position (valve opens with a maximum displacement travel during a cycle), preferably in a continuous manner, with the result that any desired lift of the valve can be set between the zero lift position and the maximum lift position. Here, the internal combustion engine is configured so as to be capable of being switched over between full cylinder operation and partial cylinder operation, at least one cylinder being switched off in partial cylinder operation and, to this end, the valves (in particular the inlet valves, preferably the inlet valves and the outlet valves) of this cylinder being moved into a zero lift position, and the remaining cylinders continuing to run. The wording "switchover between full cylinder operation and partial cylinder operation" means that the internal combustion engine can be adjusted in both directions, that is to say from full cylinder operation, in which all cylinders are operated, to partial cylinder operation, in which at least one cylinder is switched off, and vice versa, that is to say from partial cylinder operation to full cylinder operation. According to the method according to the invention, during the switchover between full cylinder operation and partial cylinder operation, the valve lift of the inlet valves of all cylinders is set temporarily to a maximum lift position, wherein, during the switchover of the internal combustion engine between the full cylinder operation and the partial cylinder operation, a) in an early switchover phase, the valve lift is increased at all cylinders (preferably during the entire early switchover phase as far as the maximum lift position), and at the same time the time of the maximum valve lift is adjusted in the early direction by means of a phase adjuster, and/or b) in a late switchover phase, the valve lift is reduced at least at the cylinders which are to continue to run after the switchover, and at the same time the time of the cycle-internal maximum valve lift is adjusted in the late direction.

The maximum valve lift means that maximum of the valve lift which occurs in each case within a cycle and is therefore the cycle-internal (local) maximum. The valve lift can be smaller than the maximum valve lift (maximum lift) which can be set, as viewed in absolute terms. The specification that the inlet valves of all valves are set temporarily to the maximum lift position during the switchover has already indicated that the method according to the invention has been developed, in particular, for internal combustion engines of the type, in which the valve lift can be set mechanically by means of a control shaft and control profiles which are configured on the latter. The only technically appropriate solution for the switchover between full cylinder operation and partial cylinder operation in internal combustion engines of this type usually consists in that all inlet valves are moved via the maximum lift position, in order either to bring about a switch-off of a cylinder or a plurality of cylinders and the setting of a zero lift position at the associated valves or, if switched-off cylinders are reactivated, in order to cancel the switch-off. Details in this regard will be described in greater detail in conjunction with the description of the figures. The method according to the invention is based on the finding which has been obtained by way of simulation calculations and tests that an efficient combustion can be achieved by way of the simultaneous change of the valve lift and the time of the maximum valve lift according to method features a) and b).

According to another mode of the invention, after performing step a), a setpoint "inlet closes" time is set during a middle switchover phase with a constant valve lift, at least at those of the cylinders which are to continue to run after the switchover.

According to another mode of the invention, before performing step b), a setpoint "inlet closes" time is set during a middle switchover phase with a constant valve lift, at least at those of the cylinders which are to continue to run after the switchover.

According to another mode of the invention, after performing step a) but before performing step b), a setpoint "inlet closes" time is set during a middle switchover phase with a constant valve lift, at least at those of the cylinders which are to continue to run after the switchover.

It is advantageous here if, after method step a) and/or before method step b) as defined above, a setpoint "inlet closes" time is set during a middle switchover phase with a constant valve lift, in particular with a maximum lift, at least at the cylinders which are to continue to run after the switchover. The setting of this type can be carried out, in particular, with the aid of the phase adjuster of the internal combustion engine. A particularly simple construction of an internal combustion engine results if in each case all inlet valves are adjusted at the same time.

According to another mode of the invention, the switchover phase extends over a plurality of engine cycles of in each case 720° crank angle, and the at least one phase adjuster is controlled in such a way that an air mass which flows in within one engine cycle during the early switchover phase and/or the late switchover phase, remains constant within a tolerance range.

Particularly satisfactory results when carrying out a method according to the invention are achieved if the switchover phase extends over a plurality of engine cycles of in each case 720° crank angle (CA), and the phase adjuster is controlled in such a way that the air mass which flows in during the early switchover phase and/or during the late switchover phase within a cycle remains constant within a tolerance range. Suitable as tolerance ranges are, in particular, deviations in the air mass within a cylinder during the individual switchover phases of ±10%, preferably ±5%, further preferably ±4% and particularly preferably at most ±3%. The tolerance range can also be fixed to be smaller, however, for example to ±2% or to ±1%.

Another mode of the invention includes adjusting the at least one phase adjuster synchronously with respect to the valve lift during at least one of the early switchover phase and the late switchover phase, in order to keep the air mass constant within the tolerance range.

The above-described function can be implemented in practice, in particular, by virtue of the fact that the phase adjuster is adjusted synchronously with respect to the valve lift during the early switchover phase and/or during the late switchover phase, in order to keep the air mass constant within a tolerance range.

Another mode of the invention includes setting an ignition angle or an injection time in a manner which is optimized in terms of a degree of efficiency during the early switchover phase and/or the late switchover phase.

The method according to the invention makes it possible to set the ignition angle or injection time in a manner which is optimized in terms of the degree of efficiency, in particular even during the early switchover phase and/or during the late switchover phase; that is to say, it is not necessary in the method according to the invention, in particular, to set an ignition angle which lowers the degree of efficiency, in order to reduce the load of the internal combustion engine in this way.

Another mode of the invention includes opening a throttle valve completely during the early switchover phase and/or the late switchover phase.

Moreover, the method according to the invention makes it possible to keep the throttle valve completely open, in particular during the early switchover phase and/or during the late switchover phase, and therefore to avoid throttle losses which are associated with partial closure of the throttle valve.

According to another mode of the invention, an adjustment of the valve lift is performed mechanically by using at least one control shaft and control shaft profiles which are configured on the at least one control shaft.

As has already been mentioned, the method according to the invention affords great advantages, in particular in the case of a mechanical adjustment of the valve lift by means of at least one control shaft and control shaft profiles which are configured on the control shaft, since it has been developed specifically for this application. A further advantage of the use of control shafts of this type is that they have already been proven for some time, and control shafts of this type have a high functional reliability on account of their relatively simple construction.

According to another mode of the invention, an adjustment of the valve lift of all outlet valves and/or all of the inlet valves of the four-stroke internal combustion engine is performed by a single control shaft.

The above is true, in particular, if the adjustment of the valve lift of all inlet valves and/or outlet valves of the internal combustion engine takes place by way of a single control shaft in a method according to the invention.

It is noted that the invention has been developed, in particular, for internal combustion engines, in which the valve lift of all cylinders can be set between a zero lift position or a virtually very small, (virtually) non-functional lift, for example of at most 1 mm, and a maximum lift. Furthermore, the invention has been developed, in particular, for what are known as quantity-controlled engines, that is to say for engines of the type, the load of which is controlled via the air quantity, and which engines as a rule have a throttle valve for this reason.

Although the invention is illustrated and described herein as embodied in a method for switching, in an efficiency-optimized manner, a four-stroke internal combustion engine including a plurality of cylinders and a fully variable valve train between a full cylinder operation and a partial cylinder operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
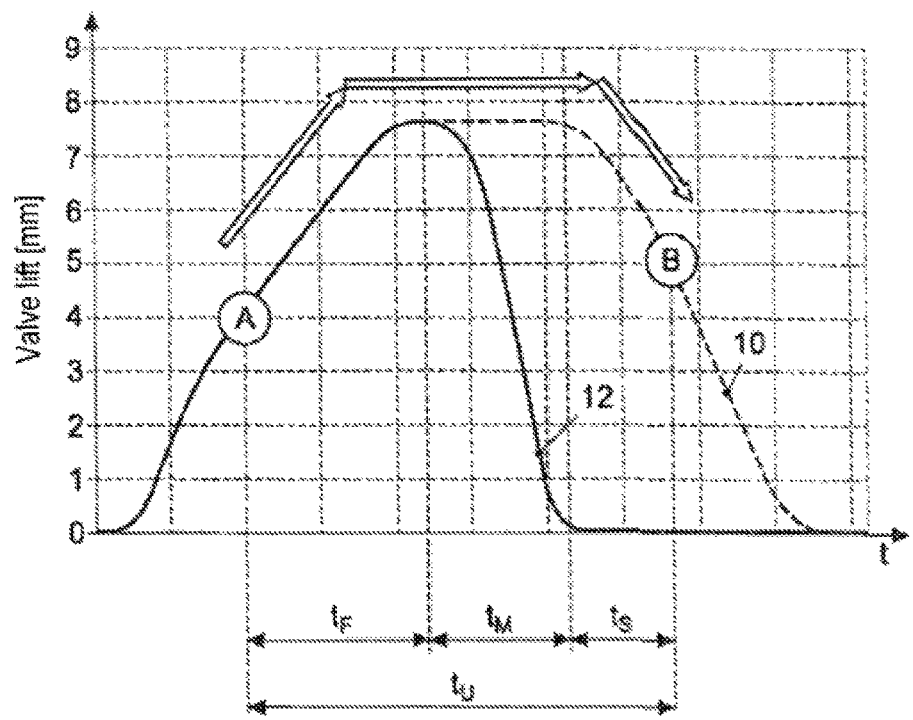
FIG. 1 shows a diagram, in which the valve lift of a first cylinder group and the valve lift of a second cylinder group of an internal combustion engine is shown as a function of the time t during a switchover from full cylinder operation to partial cylinder operation in accordance with the invention.
Figure 2:
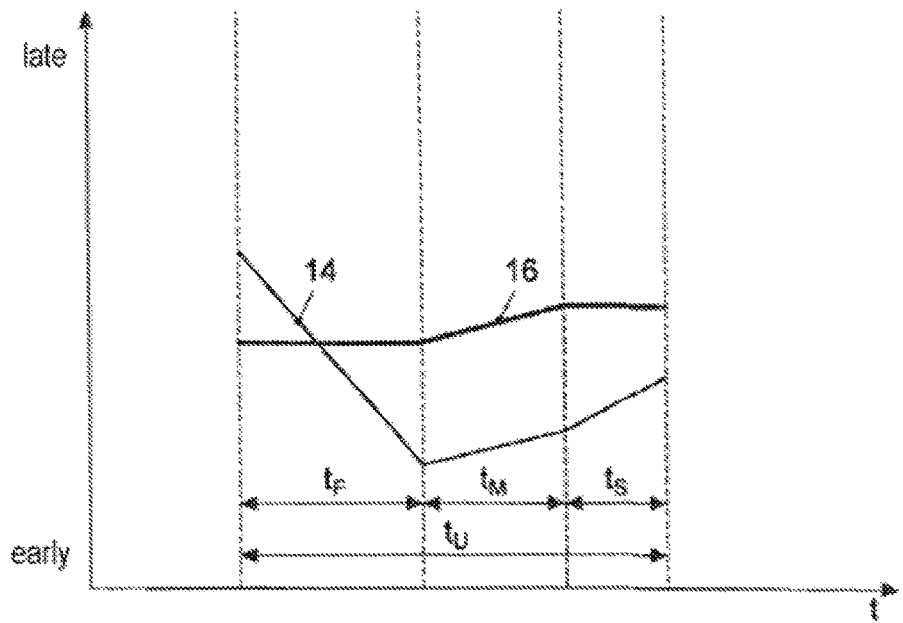
FIG. 2 shows the qualitative adjustment of the maximum of the valve lift and the closure time of the inlet valve (inlet closes) as a function of the time in a manner which corresponds to the time axis in FIG. 1 in accordance with the invention.

Using the example of a four cylinder internal combustion engine, FIGS. 1 and 2 show how two of the four cylinders can be switched off by way of the method according to the invention, with the result that, instead of in full cylinder operation with four cylinders, the internal combustion engine can be operated in partial cylinder operation with two cylinders.

FIG. 1 shows two curves 10, 12 for the profile of the set valve lift (plotted on the Y-axis) in [mm] plotted against time t, the curve 10 showing the valve lift of the cylinders 1 and 4, and the curve 12 showing the valve lift of the cylinders 2 and 3. The example from FIGS. 1 and 2 is intended to show how a switchover from full cylinder operation to partial cylinder operation can be carried out according to the method according to the invention. The load state of the internal combustion engine is the same at the plotted operating points A and B, the load at operating point A being applied by all four cylinders of the internal combustion engine and at operating point B only by the cylinders 1 and 4, since a zero lift position is set for the cylinders 2 and 3 at the operating point, that is to say the valves remain closed during the entire engine cycle.

The switchover from operating point A to operating point B takes place in the time period $t_U$ which extends over approximately 10 engine cycles. The time period $t_U$ is in turn divided into an early switchover phase $t_F$, a middle switchover phase $t_M$ and a late switchover phase $t_S$. In the early switchover phase $t_F$, the valve lift of all four cylinders is adjusted to the maximum lift. In the middle switchover phase $t_M$, the valve lift of the inlet valves of the cylinders 1 and 4 which are to be operated further after the switchover operation remains set to the maximum lift according to the curve 10, whereas the valve lift of the inlet valves of the cylinders 2 and 3 which are to be switched off after the switchover is set to the zero lift position. In the late switchover phase $t_S$, the lift of the inlet valves of the cylinders 1 and 4 is reduced to such an extent that the desired target control times are achieved. In this switchover phase, the aim is preferably to keep the load state of the engine constant during the entire switchover.

FIG. 2 illustrates the curve 14 of the qualitative profile of the adjustment of the respective cycle-internal maximum of the valve lift. The curve 16 illustrates the qualitative profile of the adjustment of the closure time of the inlet valve ("inlet closes").

As can be seen from a joint evaluation of FIGS. 1 and 2, the (respective cycle-internal) maximum of the valve lift in the early switchover phase $t_F$ is adjusted in the early direction (see Y-axis in FIG. 2) in such a way that the closure time remains constant in the switchover phase.

During the middle switchover phase $t_M$, both the closure time of the inlet valve ("inlet closes") and the maximum of the valve lift are adjusted in the late direction, to be precise to such an extent that precisely the setpoint "inlet closes" value is set which is required for the operating point B.

During the late switchover phase $t_S$, the cycle-internal maximum of the valve lift of the cylinders 1 and 4 is then adjusted in the late direction during the reduction of the valve lift according to curve 10 in FIG. 1, in such a way that the closure time of the inlet valve (inlet closes) in turn remains constant.

Figure 3:
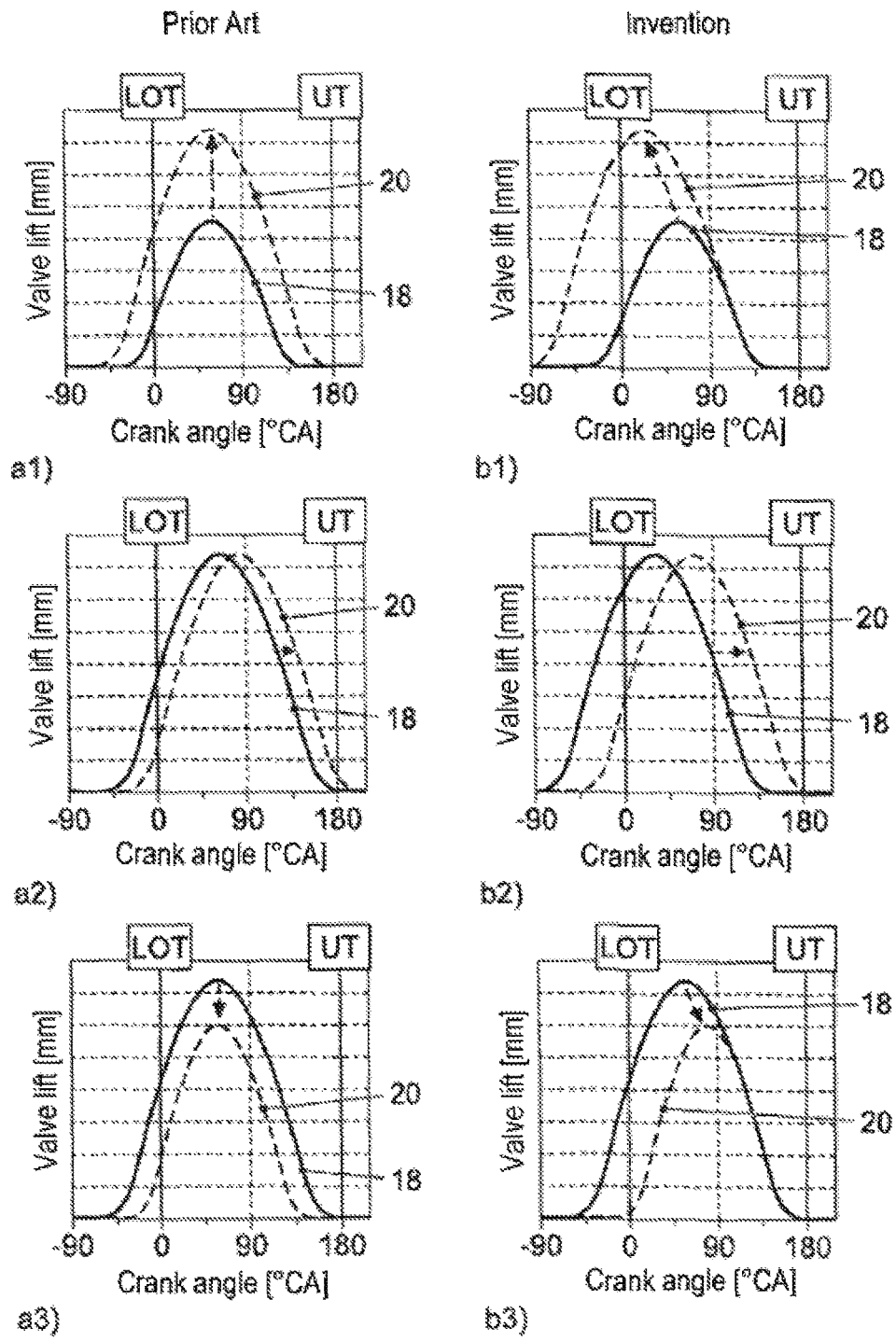
FIG. 3 shows in the illustrations a1) to a3) the profile of the valve lift including the closure time of the inlet valve of a cylinder, which continues to run, of an internal combustion engine which is operated by way of a method according to the prior art, during three different switchover phases, and shows in the illustrations b1) to b3) the profile of the valve lift including the closure time of the inlet valve of a cylinder, which continues to run, of an internal combustion engine which is operated by way of a method according to the invention, during the three phases of a switchover operation.

FIG. 3 shows specific valve lift changes on one of the cylinders 1 or 4 during the individual switchover phases by way of the respective part illustrations a1)-a2)-a3) and b1)-b2)-b3), the part illustrations a1)-a2)-a3) showing switchover phases according to the prior art, in particular as are described in the MTZ article which was mentioned at the outset, and the part illustrations b1)-b2)-b3) illustrating individual switchover phases of a method according to the invention.

The part illustrations show the valve lift at the beginning of the respective phase as a solid line 18 and at the end of the respective phase as a dashed curve 20. The dashed curve 20 of a part illustration has then been shown as a solid curve 18 in order to visualize the continuity in the respective following part illustration which is reproduced underneath, since it represents the beginning of the next phase in the part illustration.

The part illustrations a1) and b1) in each case show the early switchover phase, the part illustrations a2) and b2) in each case show the middle switchover phase, and the part illustrations a3) and b3) in each case show the late switchover phase.

As can be seen, exclusively the valve lift is adjusted both in the early switchover phase and in the late switchover phase according to the method which is known from the prior art, which leads to an adjusting closure time of the inlet. This in turn leads to an excessively high air mass flowing into the cylinders, which is compensated for by way of an adjustment of the ignition angle (ignition time) which decreases the degree of efficiency, and/or by way of a use of the throttle valve which likewise decreases the degree of efficiency.

In the method according to the invention, in contrast, the closure time of the inlet valves (inlet closes) is kept constant both during the early switchover phase and during the late switchover phase, as a result of which the ignition angle can be selected in an optimum manner and the throttle valve can remain open completely.

LOT and UT in FIG. 3 plot the top dead center during the gas exchange (gas exchange top dead center) and respectively the bottom dead center.

The features of the invention which are disclosed in the present description, in the drawings and in the claims can be essential for the implementation of the invention in its various embodiments both individually and in any desired combinations. The invention can be varied within the context of the claims and with consideration of the knowledge of a relevant person skilled in the art.

LIST OF REFERENCE CHARACTERS

10 Curve (valve lift plotted against time, cylinders 1, 4)
12 Curve (valve lift plotted against time, cylinders 2, 3)
14 Curve (adjustment of the maximum of the valve lift)
16 Curve (adjustment of the closing time of the inlet valve ("inlet closes")
18 Curve (profile of the valve lift at the beginning of the switchover phase)
20 Curve (profile of the valve lift at the end of the switchover phase)

What is claimed is:

1. A method for operating an internal combustion engine, the method comprising:
    providing a four-stroke internal combustion engine having a plurality of cylinders, a fully variable valve train, and at least one phase adjuster for changing a time of a maximum valve lift of inlet valves, wherein the four-stroke internal combustion engine is configured so as to be capable of being switched over between a full cylinder operation and a partial cylinder operation, wherein at least one of the cylinders is switched off in the partial cylinder operation and, to this end, valves of the at least one cylinder are moved into a zero lift position and remaining ones of the cylinders continue to run;
    setting a valve lift of the inlet valves of all of the cylinders temporarily to a maximum lift during a switchover between the full cylinder operation and the partial cylinder operation; and
    performing at least one of step a) and step b) during the switchover of the four-stroke internal combustion engine between the full cylinder operation and the partial cylinder operation, wherein in step a), in an early switchover phase, the valve lift is increased at all of the cylinders and, at the same time, the time of the maximum valve lift is adjusted in an early direction by the at least one phase adjuster, and wherein in step b), in a late switchover phase, the valve lift is reduced at least at those of the cylinders which are to continue to run after the switchover, and, at the same time, the time of the maximum valve lift is adjusted in a late direction.

2. The method according to claim 1, wherein, after performing step a), a setpoint "inlet closes" time is set during a middle switchover phase with a constant valve lift, at least at those of the cylinders which are to continue to run after the switchover.

3. The method according to claim 1, wherein, before performing step b), a setpoint "inlet closes" time is set during a middle switchover phase with a constant valve lift, at least at those of the cylinders which are to continue to run after the switchover.

4. The method according to claim 1, wherein, after performing step a) but before performing step b), a setpoint "inlet closes" time is set during a middle switchover phase with a constant valve lift, at least at those of the cylinders which are to continue to run after the switchover.

5. The method according to claim 1, wherein the switchover phase extends over a plurality of engine cycles of in each case 720° crank angle, and the at least one phase adjuster is controlled in such a way that an air mass which flows in within one engine cycle during at least one of the early switchover phase and the late switchover phase, remains constant within a tolerance range.

6. The method according to claim 5, which comprises adjusting the at least one phase adjuster synchronously with respect to the valve lift during at least one of the early switchover phase and the late switchover phase, in order to keep the air mass constant within the tolerance range.

7. The method according to claim 1, which comprises setting one of an ignition angle and an injection time in a manner which is optimized in terms of a degree of efficiency during at least one of the early switchover phase and the late switchover phase.

8. The method according to claim 1, which comprises opening a throttle valve completely during at least one of the early switchover phase and the late switchover phase.

9. The method according to claim 1, wherein an adjustment of the valve lift is performed mechanically by using at least one control shaft and control shaft profiles which are configured on the at least one control shaft.

10. The method according to claim 1, wherein an adjustment of the valve lift of at least one of all outlet valves and all of the inlet valves of the four-stroke internal combustion engine is performed by a single control shaft.

* * * * *